US005260127A

United States Patent [19]

Umise et al.

[11] Patent Number: 5,260,127

[45] Date of Patent: Nov. 9, 1993

[54] THERMAL TRANSFER SHEET

[75] Inventors: Shigeki Umise; Taro Suzuki, both of Tokyo; Kyoichi Yamamoto, Kanagawa, all of Japan

[73] Assignee: Dia Nippon Insatsu Kabushiki Kaisha, Japan

[21] Appl. No.: 548,094

[22] Filed: Jul. 5, 1990

[30] Foreign Application Priority Data

Jul. 7, 1989 [JP] Japan .................................. 1-176537
Jul. 7, 1989 [JP] Japan .................................. 1-176538

[51] Int. Cl.$^5$ .............................................. B32B 9/00
[52] U.S. Cl. .................................... 428/327; 428/195; 428/402; 428/688; 428/913; 428/914
[58] Field of Search ............... 428/195, 327, 331, 484, 428/488.1, 488.4, 913, 914, 206, 207, 688, 402

[56] References Cited

U.S. PATENT DOCUMENTS

| | | | |
|---|---|---|---|
| 4,163,018 | 7/1979 | Tada | 556/24 |
| 4,567,113 | 1/1986 | Ohtsu et al. | 428/488.4 |
| 4,727,057 | 2/1988 | Harrison et al. | 428/195 |
| 4,806,422 | 2/1989 | Ohno et al. | 428/488.4 |
| 4,820,686 | 4/1989 | Ito et al. | 428/195 |
| 4,925,735 | 5/1990 | Koshizuka et al. | 428/488.4 |
| 4,961,997 | 10/1990 | Asano et al. | 428/484 |

FOREIGN PATENT DOCUMENTS

| | | | |
|---|---|---|---|
| 0137741 | 4/1985 | European Pat. Off. . | |
| 0138483 | 4/1985 | European Pat. Off. . | |
| 0194106 | 10/1986 | European Pat. Off. | 428/195 |

OTHER PUBLICATIONS

G. Odian, Principles of Polymerization, 2nd ed., Wiley–Interscience, New York, 1970. pp. 20–21, 439–440.

*Primary Examiner*—Patrick J. Ryan
*Assistant Examiner*—W. Krynski
*Attorney, Agent, or Firm*—Ladas & Parry

[57] ABSTRACT

A thermal transfer sheet having a back coating layer excellent in heat-resistance is provided by using a styrene-acrylonitrile copolymer as a resin constituting the back coating layer. A thermal transfer material having an excellent heat-resistance and having a back coating layer having considerable strength is provided by incorporating at least two species of heat-resistant particles having different particle sizes in the back coating layer, since the larger species of particle imparts excellent heat-resistance to the back coating layer, the smaller species of particle enhances the total amount of the fillers, and the larger and smaller species of particles function so as to provide a synergistic effect. A thermal transfer sheet having a back coating layer which is excellent in storability is provided by incorporation an alkylphosphate multi-valent metal salt into the back coating layer, since the thus prepared back coating layer has an excellent heat-resistance, does not contaminate another menber or thermal head without wearing the thermal head, and has an excellent slip property and an excellent dye barrier property.

2 Claims, 1 Drawing Sheet

THERMAL TRANSFER SHEET

FIELD OF THE INVENTION AND RELATED ART

The present invention relates to a thermal transfer sheet, particularly to a thermal transfer sheet having an excellent heat-resistant slip coating layer (back coating layer) comprising a specific material, and to a thermal transfer sheet excellent in storability which shows a good dye-barrier property even when a sublimable dye (heat-migrating dye) is used in the recording material layer thereof.

Hitherto, in a case where output from a computer or word processor is printed by a thermal transfer system, there has been used a thermal transfer sheet comprising a substrate film and a heat-fusible ink layer disposed on one surface side thereof.

Such a conventional thermal transfer sheet comprises a substrate film comprising a paper having a thickness of 10 to 20 μm such as capacitor paper and paraffin paper, or comprising a plastic film having a thickness of 3 to 20 μm such as polyester film and cellophane film. The above-mentioned thermal transfer sheet has been prepared by coating the substrate film with a heat-fusible ink comprising a wax and a colorant such as dye or pigment mixed therein, to form a recording material layer on the substrate film.

In the prior art, in a case where a material susceptible to heat such as plastic film is used as the substrate film, a thermal head used for printing is liable to adhere to the substrate film to cause a sticking phenomenon. As a result, there may be posed a problem such that the thermal head causes peeling, the slip property thereof is impaired, the substrate film is broken, etc..

Accordingly, there has been proposed a method wherein a heat-resistant layer is formed by using a heat-resistant material such as thermosetting resin (Japanese Laid-Open Patent Application No. 30787/1989). In this method, however, it is necessary to use a curing agent such as crosslinking agent, and to use two component-type coating liquid, at the time of formation of the heat-resistant layer. Further, since the substrate film is a plastic film, heat-treatment at a relatively low temperature is required for a long time extending for several tens of hours. Such an operation is troublesome in view of the production process and further poses a problem such that wrinkles can occur without strict temperature control.

In order to solve such a problem, a method using various thermoplastic resins having a high softening point has been proposed. However, such a heat-resistant resin is difficult to be dissolved in an ordinary organic solvent and is not easy to be formed into a thin film. Further, since the above-mentioned resins to be used for such a purpose are thermoplastic resins, the heat-resistance of the resultant back coating layer is rather limited, and the adhesion property thereof with the substrate film is poor, whereby a back coating layer suitable for practical use has not been formed.

On the other hand, in order to impart heat-resistance to the back coating layer, there has been proposed a method wherein inorganic particles or crosslinked resin particles having a high heat-resintance are contained in the back coating layer. The heat-resistance of the back coating layer can be enhanced as a larger amount of such particles are added thereto. However, as the addition amount thereof become larger, the strength of the back coating layer is lowered and they impair close contact with a thermal head, whereby the heat conduction between the thermal head and the recording material layer is obstructed. As a result, the resultant heat sensitivity is liable to be lowered.

Particularly, the back coating layer may preferably be as thin as possible in consideration of heat sensitivity at the time of thermal transfer operation, and a back coating layer having a thickness of 0.5 μm or smaller has recently been desired. However, there is posed a problem such that the strength of the back coating layer and heat sensitivity are lowered when heat-resistant particles having a relatively large particles size are added to such a thin layer. As a result, a thin back coating layer having a sufficient heat-resistance has not been provided yet. When heat-resistant particles which are much smaller than the film thickness of the back coating layer are used, specific surface are a surface area/-weight of the particles is increased. Accordingly, when a large amount of such particles are incorporated into the back coating layer, the strength thereof is considerably lowered. On the other hand, when a small amount of such particles are incorporated thereinto, the resultant heat-resistance is insufficient.

In order to improve the slip property (or slip characteristic) of the back coating layer with respect to a thermal head, there has been proposed a method wherein a lubricating agent (or lubricant) having a relatively low melting point such as silicone oil, low-melting point wax and surfactant is added to the back coating layer. However, since these lubricating agents have a low melting point, they tend to migrate another object. For example, when the resultant thermal transfer sheet is wound up into a roll form, there is posed a problem such that the lubricating agent migrates to the ink layer disposed opposite thereto and impairs the transferability of the ink layer. Further, since the above-mentioned lubricating agent is softened or melted at the time of thermal transfer operation and slips a thermal head, it inevitably contaminates the thermal head.

There has also been proposed a method of using ceramic fine particles and/or inorganic fine particles such as talc and mica which do not cause the above-mentioned problem (Japanese Laid-Open Patent Application No. 3989/1987). However, in such a case, there is a problem such that these inorganic lubricating agents considerably wear the thermal head.

The above-mentioned thermal transfer systems include a so-called sublimation-type thermal transfer system which has a continuous graduation characteristic and is capable of providing a full-color image comparable to a color photograph.

The thermal transfer sheet to be used in the above-mentioned sublimation-type thermal transfer system generally comprises a substrate film such as polyester film, and a recording material layer containing a sublimable dye disposed on one surface side of the substrate film. In general, on the other (or opposite) surface side of the substrate film, a back coating layer is disposed in order to prevent the adhesion of the substrate film to a thermal head and to improve the slip property thereof.

When such a thermal transfer sheet is superposed on an image-receiving sheet having an image-receiving layer so that the recording material layer of the thermal transfer sheet contacts the image-receiving sheet, and the thermal transfer sheet is imagewise heated from the back surface side thereof by means of a thermal head, the dye constituting the recording material layer migrates to the image-receiving sheet, thereby to form a desired image.

The above-mentioned thermal transfer sheet is generally produced by using a continuous film as the substrate film, and the thus produced thermal transfer sheet is generally stored in a roll form until actual use thereof.

In a case where the thermal transfer sheet is stored in a roll form, the sublimation-type thermal transfer sheet is liable to pose a peculiar problem such that since the recording material layer is superposed on the back coating layer, the dye constituting the recording material layer migrates to the back coating layer. Accordingly, the back coating layer is required to have three species of functions including a dye-barrier property in addition to heat-resistance and slip property.

In order to impart the dye barrier property to the back coating layer, there has heretofore been proposed a method wherein a setting resin film having no dyeability (or dyeing property) is formed as the back coating layer. However, when such a film is formed, the slip property of the back coating layer is deteriorated. In order to enhance the slip property, a wax, surfactant or silicone oil, having a relatively low melting point has been added to the back coating layer. However, these additives are rather liable to migrate to the surface of the recording material layer to reduce the transferability of the dye constituting the recording material layer.

As described above, in the prior art, it is extremely difficult to simultaneously impart heat-resistance, slip property and dye-barrier property to the back coating layer.

SUMMARY OF THE INVENTION

A principal object of the present invention is to solve the above-mentioned problems encountered in the prior art and to provide a thermal transfer sheet containing a back coating layer having excellent heat resistance, slip property and dye-barrier property.

According to a first aspect of the present invention, there is provided a thermal transfer sheet comprising a substrate film, a recording material layer formed on one surface side of the substrate film, and a back coating layer formed on the other surface side of the substrate film to be in contact with a thermal head; wherein the recording material layer comprises a heat-fusible ink capable of being melted under heating, and the back coating layer comprises a binder predominantly comprising a styrene-acrylonitrile copolymer.

According to a second aspect of the present invention, there is provided a thermal transfer sheet comprising a substrate film, a recording material layer formed on one surface side of the substrate film, and a back coating layer formed on the other surface side of the substrate film to be in contact with a thermal head; wherein the recording material layer comprises a heat-fusible ink capable of being melted under heating, and the back coating layer comprises a binder and at least two species of heat-resistant particles having different particle sizes.

According to a third aspect of the present invention, there is provided a thermaltransfer sheet comprising a substrate film, a recording material layer formed on one surface side of the substrate film, and a back coating layer formed on the other surface side of the substrate film to be in contact with a thermal head; wherein the recording material layer comprises a heat-fusible ink capable of being melted under heating, and the back coating layer comprises a binder and an alkylphosphate multi-valent metal salt.

According to a fourth aspect of the present invention, there is provided a thermal transfer sheet comprising a substrate film, a recording material layer formed on one surface side of the substrate film, and a back coating layer formed on the other surface side of the substrate film to be in contact with a thermal head; wherein the recording material layer comprises a dye and a binder, and the back coating layer comprises a binder and an alkylphosphate multi-valent metal salt.

According to a fifth aspect of the present invention, there is provided a thermal transfer sheet comprising a substrate film, a recording material layer formed on one surface side of the substrate film, and a back coating layer formed on the outer surface side of the substrate film to be in contact with a thermal head; wherein the recording material layer comprises a heat-fusible ink capable of being melted under heating, and the back coating layer comprises a binder predominantly comprising a styrene-acrylonitrile copolymer, at least two species of heat-resistant particles having different particle sizes, and an alkylphosphate multi-valent metal salt.

These and other objects, features and advantages of the present invention will become more apparent upon a consideration of the following description of the preferred embodiments of the present invention taken in conjunction with the accompanying drawings

DETAILED DESCRIPTION OF PREFERRED EMBODIMENTS

Hereinbelow, the present invention is specifically described with reference to accompanying drawings.

Figure 1:
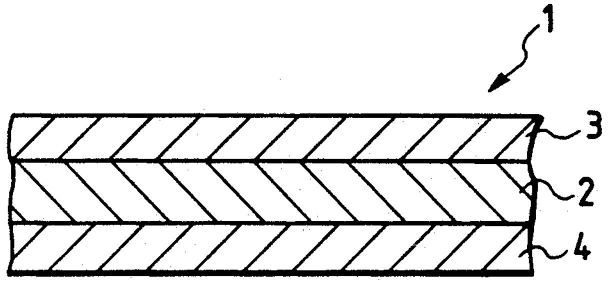
FIG. 1 is a schematic sectional view showing an embodiment of the thermal transfer sheet according to the present invention.

FIG. 1 is a schematic sectional view showing an embodiment of the thermal transfer sheet according to the present invention. Referring to FIG. 1, the thermal transfer sheet 1 comprises a substrate film 2, a back coating layer 3 formed on one surface side of the substrate film 2, and a recording material layer 4 formed on the other surface side of the substrate film 2. The above-mentioned back coating layer 3 is one capable of contacting a thermal head.

The substrate film 2 to be used in the present invention may be one selected from those used in the conventional thermal transfer sheet. However, the above-mentioned substrate film 2 is not restricted thereto and can be any of other films.

Preferred examples of the substrate film 2 may include: plastic films such as those comprising polyester, polypropylene, cellophane, polycarbonate, cellulose acetate, polyethylene, polyvinyl chloride, polystyrene, nylon, polyimide, polyvinylidene chloride, polyvinyl alcohol, fluorine-cortaining resin, chlorinated rubber, and ionomer resin; papers such as capacitor paper and paraffin paper; non-woven fabric; etc.. The substrate film 2 can also comprise a combination or laminate of the above-mentioned films.

The substrate film 2 may preferably have a thickness of 0.5 to 50 μm, more preferably 3 to 10 μm, while the thickness can appropriately be changed corresponding to the materials thereof so as to provide suitable strength and heat conductivity.

The back coating layer primarily chracterizing the present invention is formed on one surface side of the above-mentioned substrate film. The substrate film may preferably be one having a relatively high heat resistance such as polyethylene terephthalate film.

The above-mentioned back coating layer 3 may comprise a binder resin and an optional additive.

Specific examples of the binder resin may include: cellulose resins such as ethylcellulose, hydroxyethyl cellulose, ethyl-hydroxy-ethylcellulose, hydroxypropyl cellulose, methylcellulose, cellulose acetate, cellulose acetate bytyrate, and nitrocellulose; vinyl-type resins such as polyvinyl alcohol, polyvinyl accetate, polyvinyl butyral, polyvinyl acetal, polyvinyl pyrroliclone, acrylic resin, polyacrylamide, and acrylonitrile-styrene copolymer; polyester resin, poly-urethane resin, silicone-modified or fluorine-modified urethane resin, etc.. Among these, it is preferred to use a resin having a somewhat reactivity (e.g., one having hydroxyl group, carboxyl group, or epoxy group) in combination with a crosslinking agent such as polyisocyanate so as to provide a crosslinked resin layer.

According to a first aspect of the present invention, the binder resin constituting the back coating layer 3 predominantly comprises a styrene-acrylonitrile copolymer. In such an embodiment, a back coating layer 3 having an excellent heat resistance may be formed without crosslinking.

The above-mentioned styrene-acrylonitrile copolymer may be obtained by co-polymerizing styrene and acrylonitrile. Such a copolymer may easily be prepared in an ordinary manner. In addition, any of commercially available products of various grades can be used in the present invention. Specific examples thereof may include those sold under the trade names of Sebian AD, Sebian LD, and Sebian NA (mfd. by Daiseru Kagaku K. K.).

Among styrene-acrylonitrile copolymers of various grades, it is preferred to use one having a molecular weight of $10\times10^4$ to $20\times10^4$ (more preferably $15\times10^4$ to $19\times10^4$), and/or an acrylonitrile content of 20 to 40 mol % (more preferably 25 to 30 mol %). Such a copolymer may preferably have a softening temperature of 400° C. or higher according to differential thermal analysis, in view of heat resistance and dissolution stability to an organic solvent.

In a case where the substrate film comprises a polyethylene terephthalate film, the adhesion property between the above-mentioned styrene-acrylonitrile copolymer and the substrate film is not necessarily sufficient. Accordingly, in such a case, it is preferred to subject a monomer containing a small amount (e.g., several mol percent) of a functional group (such as methacrylic acid) to copolymerization, at the time of production of the styrene-acrylonitrile copolymer.

As described above, in a case where a styreneacrylonitrile copolymer is used as the resin constituting a back coating layer 3, there is provided a thermal transfer sheet having a back coating layer excellent in heat resistance, without troublesome heat treatment.

Figure 2:
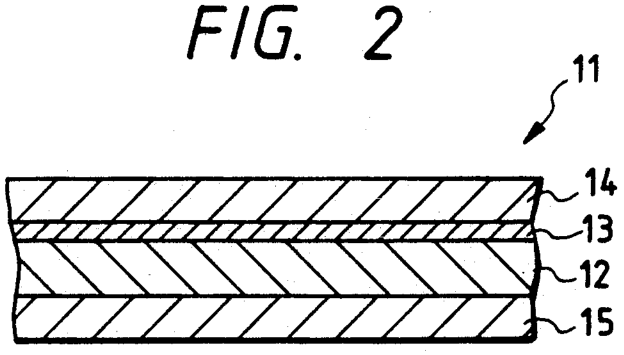
FIG. 2 is a schematic sectional view showing another embodiment of the thermal transfer sheet according to the present invention.

In another embodiment of the present invention, as shown in FIG. 2, it is possible that a primer layer 13 is preliminarily formed on one surface side of a substrate film 12, a back coating layer 14 is then formed on the primer layer 13, and further a recording material layer 15 is formed on the other surface side of the substrate film 12, whereby a thermal transfer sheet 11 is obtained. The primer layer 13 may be formed by applying an adhesive resin onto the substrate film 12. Further, it is possible to use a small amount of such an adhesive resin in combination with the above-mentioned binder.

The adhesive resin may preferably comprise an amorphous linear saturated polyester resin having a glass transition point of 50° C. or higher. Example of such a polyester resin may include: those sold under trade names of Bairon (mfd. by Toyobo K. K.), Eriter (mfd. by Unitika K. K.), Polyester (mfd. by Nihon Gosei Kagaku K. K.). These resins of various grades are commercially available, and any of these resins can be used in the present invention.

Particularly preferred examples of such a resin may include Bairon RV 290 (mfd. by Toyobo K. K., product containing epoxy groups introduced thereinto, molecular weight=$2.0\times10^4$ to $2.5\times10^4$, Tg=77° C., softening point=180° C., hydroxyl valve=5 to 8).

In a case where the above-mentioned polyester resin is used for forming a primer layer, it is preferred to form the primer layer having a thickness of about 0.05 to 0.5 μm. If the thickness is too small, the resultant adhesive property may be insufficient. If the thickness is too large, sensitivity to a thermal head or heat resistance may undesirably be lowered.

In a case where the adhesive resin (e.g., polyester resin) is used in a mixture with the above-mentioned styrene-acrylonitrile copolymer, the adhesive resin content may preferably be 1 to 30 wt. parts per 100 wt. parts of the styrene-acrylonitrile copolymer. If the adhesive resin content is too low, the resultant adhesive property may be insufficient. If the adhesive resin content is too high, the heat resistance of the back coating layer may be lowered, or sticking may be caused.

According to a second aspect of the present invention, the back coating layer 3 comprises a binder resin as described above, and at least two species of heat-resistant particles having different particle sizes. The back coating layer 3 can also contain an optional additive.

The heat-resistant particles used in the present invention may be as such known in the art. Specific examples thereof may include: Hydrotalsite DHT-4A (mfd. by Kyowa Kagaku Kogyo), Talcmicroace L-1 (mfd. by Nihon Talc), Taflon Rubron L-2 (mfd. by Daikin Kogyo), Fluorinated Graphite SCP-10 (mfd. by Sanpo Kagaku Kogyo), Graphite AT40S (mfd. by Oriental Sangyo), carbon black, and fine particles such as silica, calcium carbonate, precipitated barium sulfate, crosslinked urea resin powder, crosslinked melamine resin powder, crosslinked styrene-acrylic resin powder, crosslinked amino resin powder, silicone resin powder, wood meal, molybdenum disulfide, and boron nitride.

As the above-mentioned heat-resistant particles, those having various particle sizes are commercially available. In the present invention, a mixture of at least two species of heat-resistant particles having clearly different particle sizes is used.

The particle sizes of these particles may proferably be selected corresponding to the thickness of the back coating layer to be formed. In a preferred embodiment of the present invention, since the back coating layer may preferably have a thickness of 0.1 to 0.5 μm, the larger species of particle constituting the above-mentioned at least two species of heat-resistant particles may preferably have a particle size in the range of X/2 to X, wherein X denotes the thickness of the back coating layer. For example, in a case where the back coating layer has a thickness of 0.5 μm, it is preferred to use the larger heat-resistant particles having a particle size of 0.25 to 0.5 μm. If the particle size is smaller than ½ times the thickness of the back coating layer, resultant improvement in heat-resistance is insufficient. On the other hand, if the particle size is larger than the thickness of the back coating layer, the formation of a back coating layer having a smooth surface is considerably obstructed, whereby a thermal head is liable to be worn.

On the other hand, the smaller species of particle constituting the above-mentioned at least two species of heat-resistant particles may preferably have a particle size which is ½ times or smaller the particle size of the above-mentioned larger particles. For example, when the larger species of particle has a particle size of 0.3 μm, the smaller species of particle may preferably have a particle size of 0.15 μm or smaller. If the smaller species of particle has a particle size exceeding such 0.15 μm, the particle size difference between the two species of particles is small, whereby it is difficult to fill the gaps between the larger particles with the smaller particles.

The present invention is based on a discovery such that sufficient strength of a back coating layer may be maintained by using a combination of at least two species of heat-resistant particles having different particle sizes as described above, even when a relatively large amount of the heat-resistant particles are contained in the back coating layer.

More specifically, the larger species of heat-resistant particle has a function of imparting sufficient heat resistance to the back coating layer. On the other hand, the smaller species of heat-resistant particle has a function such that they fill gaps between the larger species of particle without decreasing the strength of the back coating layer, thereby to increase the heat-resistant particle content in the back coating layer and to further improve the heat-resistance of the back coating layer.

The above-mentioned heat-resistant particles may prepferably be used in an amount of 10 to 200 wt. parts with respect to 100 wt. parts of a binder. Further, the weight ratio between the larger and smaller species of particle may preferably be (20 to 80):(80 to 20). Outside these ranges of the amount and ratio to be used, good heat-resistance and strength of the back coating layer are not compatible with each other.

In the present invention, when the back coating layer is formed by using the above-mentioned material, a thermal release agent or lubricating agent (or lubricant) may also be contained therein, within such an extent that the addition thereof does not substantially obstruct the achievement of the object of the present invention. Specific examples of such a release agent or lubricating agent may include wax, higher fatty acid amide, ester, surfactant, and higher fatty acid metal salt.

As described above, in an embodiment wherein at least two species of heat-resistant particles having different particle sizes are contained in the back coating layer 3, the larger species of particle imparts good heat resistance to the back coating layer and the smaller species of particle enhances the total amount of the filler. As a result, there is formed a back coating layer having good heat resistance and film strength by the synergistic effect based on the larger and smaller species of particles.

According to a third aspect of the present invention, the back coating layer comprises a binder resin as described above, and a lubricating agent (or lubricant) comprises an alkylphosphate (or alkylphosphoric acid ester) multi-valent metal salt. The back coating layer can further contain an optional additive.

The alkylphosphate multi-valent metal salt may be obtained by replacing the alkali metal of an alkylphosphate alkali metal salt with a multi-valent metal, and the alkylphosphate multi-valent metal salt per se is known as an additive for plastic in the art. Such multi-valent metal salts of various grades are commercially available, and any of these multi-valent metal salts can be used in the present invention.

Preferred examples of the alkylphosphate multi-valent metal salt may include those represented by the following formula:

$$[(RO)_2\overset{\overset{\displaystyle O}{\|}}{P}—O—]_nM, \text{ and/or}$$

$$[(RO)\overset{\overset{\displaystyle O}{\|}}{P}=(O—)2]_{n/s}M,$$

wherein R denotes an alkyl group having 12 or more carbon atoms; M denotes zinc cation or aluminum cation, and n denotes the valence of M.

It is preferred to use the above-mentioned alkylphosphate multi-valent metal salt in an amount of 10 to 150 wt. parts with respect to 100 wt. parts of the above-mentioned binder resin. If the amount of the multi-valent salt to be used is below the above range, sufficient slip property is difficult to be obtained. On the other hand, if the amount of the multi-valent salt exceeds the above range, the physical strength of the back coating layer may undesirably be lowered.

Further, in order to impart an antistatic property to the back coating layer 3, it is possible to add thereto a conductivity-imparting agent such as carbon black, or an antistatic agent such as quaternary ammonium salt and phosphate.

The back coating layer 3 may be formed by dissolving or dispersing the above-mentioned material in an appropriate solvent such as acetone, methyl ethyl ketone, toluene and xylene to prepare a coating liquid; and applying the coating liquid by an ordinary coating means such as gravure coater, roll coater, and wire bar; and drying the resultant coating.

The coating amount of the back coating layer, i.e., the thickness thereof, is also important. In the present invention, a back coating layer having sufficient performances may preferably be formed by using a coating amount of 0.5 g/m$^2$ or below, more preferably 0.1 to 0.5 g/m$^2$, based on the solid content thereof. If the back coating layer is too thick, the thermal sensitivity at the time of transfer operation may undesirably be lowered.

As described above, the alkylphosphate multi-valent metal salt to be used in the present invention has a melting point of 150° C. or higher, and further has a melting point of 200° C. or higher in most cases, while it has an excellent slip property. As a result, there is provided a thermal transfer sheet which not only has an excellent heat resistance but also has an excellent slip property without contaminating another member (or object) or a thermal head, or wearing the thermal head.

In the present invention, the recording material layer 4 may comprise an ink comprising a heat-fusible ink capable of being melted under heating and an optional mixed therewith.

The heat-fusible ink used in the present invention comprises a colorant and a vehicle. The heat-fusible ink can also contain an optional additive selected from various species thereof, as desired.

The colorant may preferably be one having a good recording property as a recording material, which is selected from organic or inorganic dyes or pigments. For example, the colorant may preferably be one having a sufficient coloring density (or coloring power) and is not substantially faded due to light, heat, temperature, etc..

The colorant can also comprise a substance such that it is colorless under no heating, or develops a color when it contacts another substance which has been applied onto a transfer-receiving member. The colorant may be one capable of providing various colors in illusive of cyan, magenta, yellow, and black.

The vehicle may predominantly comprise a wax or may comprise a mixture of a wax and another component such as drying oil, resin, mineral oil, and derivatives of cellulose and rubber.

Representative examples of the wax may include microcrystalline wax, carnauba wax, paraffin wax, etc.. In addition, specific examples of the wax may include: various species thereof such as Fischer-tropsch wax, various low-molecular weight polyethylene, Japan wax, beeswax, whale wax, insect wax, lanolin, shellac wax, candelilla wax, petrolactam, partially modified wax, fatty acid ester, and fatty acid amide.

In order to impart good heat conductivity and melt-transferability to the heat-fusible ink layer, a heat-conducting substance can also be incorporated into the heat-fusible ink. Specific examples of such a heat-conducting substance may include carbon substances such as carbon black, aluminum, copper, tin oxide, and molybdenum disulfide.

In order to directly or indirectly form a heat-fusible ink layer on a substrate film, there may be used a method wherein a hot-melt coating material or a hot-lacquer coating material containing a solvent is prepared and such a coating material is applied by various means such as gravure coating, gravure reverse coating, gravure offset coating, roller coating and wire-bar coating. The thickness of the ink layer to be formed should be determined so that the requisite image density and thermal sensitivity are balanced with each other. The thickness may preferably be 0.1 to 30 μm, more preferably 2 to 10 μm.

In the present invention, it is possible to further disposed a surface layer on the above-mentioned ink layer. The surface layer constitutes a portion of a transferable film and has a function such that it forms a surface on one surface side contacting a transfer-receiving paper and sealing the printed portion of the transfer-receiving paper, and it prevent ground staining and enhances the adhesion property of the ink layer to the transfer-receiving paper.

The surface layer may comprise a wax which is the same as that used in the above-mentioned heat-fusible ink layer.

The surface layer comprising the wax may be formed by applying a liquid of melted wax and cooling the resultant coating; by applying a solution of the wax in an organic solvent and drying the resultant coating; by applying an aqueous dispersion containing particles of the wax and drying the resultant coating, etc..

The surface layer may be formed by using various techniques in the same manner as in the formation of the ink layer. The surface layer may be selected so that the sensitivity does not become insufficient even in the case of a high-speed type printer using a low printing energy. In the present invention, the surface layer may preferably have a thickness which is not smaller than 0.1 μm and smaller than 5 μm.

It is preferred to add an appropriate amount of extender pigment to the surface layer, since such a pigment prevents blurring or tailing of printed letters more effectively.

The printed letter obtained by thermal transfer method generally has a gloss and is beautiful, but in some cases, such a printed letter can decrease the readableness of the resultant document. Accordingly, dull printed images are sometimes preferred. In such a case, it is preferred that a dispersion obtained by dispersing an inorganic pigment such as silica and calcium carbonate in appropriate resin and solvent is applied onto a substrate film to form thereon a mat layer, and then a heat-fusible ink is applied onto the met layer; thereby to prepare a thermal transfer sheet, as proposed by our research group in Japanese Patent Application No. 208306/1983. Alternatively, it is possible to mat a substrate film per se, as proposed by our research group in Japanese Patent Application No. 208307/1983.

As a matter of course, the present invention is applicable to a thermal transfer sheet for color printing. Accordingly, a multi-color thermal transfer sheet is also within the scope of the present invention.

According to a fourth aspect of the present invention, the recording material layer 4 comprise an ink comprising a sublimable (or heat-migrating) dye, and another material as desired.

The dye used in the present invention may be any of dyes usable in the conventional thermal transfer sheet, and is not particularly restricted. Preferred examples of such a dye may include; red dyes such as MS Red G, Macrolex red Violet R, Ceres Red 7B, Samaron Red HBSL, Resolin Red F3BS; yellow dyes such as Horon Brilliant Yellow 6GL, PTY-52, Macrolex Yellow 6G; and blue dyes such as Kayaset Blue 714, Wacsorin Blue AP-FW, Horon Brilliant Blue S-R, and MS Blue 100.

As the binder for carrying the above-mentioned heat-migrating dye, any of known binders can be used. Preferred examples of the binder resin may include: cellulose resins such as ethylcellulose, hydroxyethyl cellulose, ethylhydroxy-ethylcellulose, hydroxypropyl cellulose, methylcellulose, cellulose acetate, and cellulose acetate butyrate; vinyl-type resins such as polyvinyl alcohol, polyvinyl acetate, polyvinyl butyral, polyvinyl acetal, polyvinyl pyrrolidone, and polyacrylamide; and polyester resin. Among these, cellulose resins, acetal-type resins, butyral-type resins, and polyester-type resins are particularly preferred.

The recording material layer can further contain an additive selected from those known in the prior art, as desired.

The recording material layer 4 may preferably be formed by dissolving or dispersing the above-mentioned sublimable dye, binder resin and another optional components in an appropriate solvent to prepare a coating material or ink; applying the coating material or ink onto the above-mentioned substrate film; and drying the resultant coating.

The thus formed recording material layer 4 may generally have a thickness of about 0.2 to 5.0 μm, preferably about 0.4 to 2.0 μm. The sublimable dye content in the recording material layer 4 may preferably be 5 to 90 wt. %, more preferably 10 to 70 wt. % based on the weight of the recording material layer.

In a case where a recording material layer containing a sublimable dye as described above is formed, the back coating layer 3 may preferably contain a lubricating agent comprising alkylphosphate multi-valent metal salt.

As described herein above, the alkylphosphate multi-valent metal salt to be used in the present invention has a melting point of 150° C. or higher, and further has a melting point of 200° C. or higher in most cases, while it has an excellent slipping property. As a result, there is provided a thermal transfer sheet having an excellent dye barrier property which not only has an excellent heat resistance, but also has an excellent slipping property without contaminating another member or a thermal head, or wearing the thermal head.

The image-receiving sheet to be used for forming an image by use of the above-mentioned thermal transfer sheet containing a sublimable dye may be any of those having a recording surface having a dye receptibility to the above-mentioned dye. In a case where a sheet or film having no dye receptibility such as paper, metal, glass and synthetic resin, it is sufficient to form a dye-receiving layer on at least one surface side of the sheet or film by using a resin having a good dyeing property. Further, such a dye-receiving layer can also contain an optional additive within such an extent that the object of the present invention is not substantially obstructed. Specific examples of the additive may include: solid wax known as a release agent, such polyethylene wax, amide wax, and teflon powder; surfactant such as fluorine-containing surfactant and phosphoric ester-type surfactant.

In order to impart heat energy to the thermal transfer sheet according to the present invention at the time of thermal transfer operation, it is possible to use any of known heat-supplying means. For example, an intended object may sufficiently be attained by imparting a heat energy of about 5 to 100 $mJ/mm^2$ to the thermal transfer sheet by means of a recording apparatus such as thermal printer (e.g., Video Printer VY-100, mfd. by Hitachi Seisakusho K. K.).

EXPERIMENTAL EXAMPLE

Hereinbelow, the thermal transfer sheet according to the present invention is described in more detail with reference to Experimental Examples. In the description and Tables appearing hereinafter, "part(s)" and "%" are "part(s) by weight" and "wt. %", respectively, unless otherwise noted specifically.

First, there were provided 13 species (B-1 to B-13) of binder resins as shown in Table 1 appearing hereinafter.

Separately, there were provided 7 species (L-1 to L-7) of lubricating agents as shown in Table 2 appearing hereinafter.

Further, there were provided 6 species (P-1 to P-6) of heat-resistant particles as shown in Table 3 appearing hereinafter.

Further, there was provided electroconductive carbon and a solvent mixture as shown in Tables 4 and 5, respectively.

TABLE I

| Binder No. | Name |
|---|---|
| B-1 | Polyvinyl butyral resin<br>Esrec BX-1, mfd. by Sekisui kagaku K.K.) |
| B-2 | Styrene-acrylonitrile copolymer<br>(Sebian AD, mfd. by Daiseru Kagaku K.K.) *1 |
| B-3 | Styrene-acrylonitrile copolymer<br>Sebian LD, mfd. by Daiseru Kagaku K.K.) *2 |
| B-4 | Styrene-acrylonitrile copolymer<br>(Sebian NA, mfd. by Daireru Kagaku K.K.) *3 |
| B-5 | Nitrocellulose H ½ sec resin<br>(Serunoba BTH ½, mfd. by Asahi Kasei K.K. |
| B-6 | Cellulose acetate propionate resin<br>(CAP 482-05, mfd. by Eastman Kodak K.K.) |
| B-7 | Polyvinyl butyral resin<br>(Esrec BLS, mfd. by Sekisui Kagaku K.K.) |
| B-8 | Linear saturated polyester resin<br>(Eriter UE 3200, mfd. by Unitika K.K.) |
| B-9 | Linear saturated polyester resin<br>(Bairon #200, mfd. by Toyobo K.K.) |
| B-10 | Linear saturated polyester resin<br>(Polyester TP-220, mfd. by Nihon Gosei Kagaku K.K.) |
| B-11 | Linear saturated polyester resin<br>(Bairon #280, mfd. by Toyobo K.K.) |
| B-12 | Linear saturated polyester resin<br>(Eriter UE 3201, mfd. by Unitika K.K.) |
| B-13 | Partially saponified vinyl chloride - vinyl acetate copolymer<br>(Vinilite VAGH, mfd. by UCC) |

*1: M.W. (molecular weight) = 18.5 × $10^4$, AN mol % = 29.5%, DSC peak temp. = 444° C.,
*2: M.W. = 15.0 × $10^4$, AN mol % = 29.0%, DSC peak temp. = 442° C.,
*3: M.W. = 16.0 × $10^4$, AN mol % = 29.5%, DSC peak temp. = 436° C.

TABLE 2

| Lubricant No. | Name |
|---|---|
| L-1 | Zinc stearyl phosphate<br>(LBT 1830, mfd. by Sakai Kagaku K.K.) |
| L-2 | Aluminum stearyl phosphate<br>(LBT 1813, mfd. by Sakai Kagaku K.K.) |
| L-3 | Lithium stearate<br>(S-7000, mfd. by Sakai Kagaku K.K.) |
| L-4 | Polyethylene wax<br>(Mark FC 113, mfd. by Adeka-Argus K.K.) |
| L-5 | Zinc stearate<br>(SZ 2000, mfd. by Sakai Kagaku K.K.) |
| L-6 | Aluminum stearate<br>(SA 1000, mfd. by Sakai Kagaku K.K.) |
| L-7 | Calcium stearate<br>(SC 100, mfd. by Sakai Kagaku K.K.) |

TABLE 3

| Heat-resistant Particle No. | Name | Particle size (μm) |
|---|---|---|
| P-1 | Crosslinked urea resin powder<br>(Organic filler, mfd. by Nihon Kasei K.K.) | 0.14 |
| P-2 | Crosslinked melamine resin powder<br>(Epostar S, mfd. by Nihon Shokubai Kagaku K.K.) | 0.3 |
| P-3 | Crosslinked acrylic resin powder<br>(GL-100, mfd. by Soken Kagaku K.K.) | 0.1 |
| P-4 | Fluorinated graphite<br>(FC 2065, mfd. by Allied Chemical Co.) | 0.4 |
| P-5 | Fluorocarbon<br>(Moldwitz F 57, mfd. by Accel Plastic Co.) | 0.1 |
| P-6 | Crosslinked acrylic resin powder<br>(GL-300, mfd. by Soken Kagaku K.K.) | 0.1 |

TABLE 4

| Electroconductive Carbon | Name |
|---|---|
| C-1 | Ketjen black EC 600 JD<br>(mfd. by Lion-Akuzo K.K.) |

TABLE 5

| Solvent | Name |
|---|---|
| S-1 | Methyl ethyl ketone/toluene mixture solvent (mixing ratio = 1:1) |

By using the above-mentioned respective materials, 17 species (I-1 to I-17) of inks for back coating layer were prepared, as shown in Table 6 appearing hereinafter. Further, two species (I-18 and I-19) of comparative inks for back coating layer were prepared.

More specifically, with respect to inks I-1, I-2, I-3, I-9 and I-10, respective materials were mixed under stirring and subjected to dispersing treatment for three hours by means of a paint shaker. To 100 parts of the resutant product, 16 parts of polyisocyanate curing agent (Coronate L, mfd. by Nihon Polyurethane K. K.) and an appropriate amount of a diluting solvent (MEK/-toluene=1/1) were added, thereby to prepare the above-mentioned respective inks for back coating layer.

With respect to the other inks, respective materials were mixed under stirring and subjected to dispersing treatment for three hours by means of a paint shaker. To the resultant product, an appropriate amount of a diluting solvent (MEK/toluene=1/1) was added, thereby to prepare the respective inks for back coating layer.

Separately, 5 parts of an epoxy-modified linear saturated polyester resin (Bairon RV 290, Tg=77° C., mp=180° C., mfd. by Toyobo K. K.) was dissolved in 95 parts of a mixture solvent (MEK/toluene=1/1), thereby to prepare a primer coating material.

TABLE 6

| Ink for back coating layer | Binder No. | | Lubricant No. | | Heat-resistant particles No. | | Electro-conductive carbon (C-1) | Solvent (S-1) |
|---|---|---|---|---|---|---|---|---|
| I-1 | B-1 | | L-1 | | P-1 | P-2 | | |
| | 6.0 | | 6.0 | | 0.8 | 1.0 | | 86.2 |
| I-2 | B-1 | B-7 | L-2 | | P-3 | P-2 | | |
| | 4.0 | 2.0 | 6.0 | | 2.0 | 1.8 | | 84.2 |
| I-3 | B-1 | B-7 | L-1 | L-3 | P-1 | P-4 | | |
| | 4.0 | 2.0 | 1.0 | 3.0 | 2.0 | 1.0 | 1.5 | 85.5 |
| I-4 | B-2 | B-8 | L-1 | | P-1 | P-2 | | |
| | 6.0 | 0.3 | 3.0 | | 3.0 | 1.5 | | 86.2 |
| I-5 | B-3 | B-9 | L-6 | L-4 | P-5 | P-2 | | |
| | 6.0 | 0.3 | 4.5 | 3.0 | 2.0 | 3.0 | | 81.2 |
| I-6 | B-4 | B-10 | L-5 | | P-1 | P-2 | | |
| | 6.0 | 0.3 | 4.5 | | 1.5 | 1.5 | 0.8 | 85.4 |
| I-7 | B-5 | B-8 | L-1 | | P-1 | P-2 | | |
| | 10.0 | 1.0 | 5.0 | | 2.5 | 1.5 | | 80.0 |
| I-8 | B-6 | B-11 | L-1 | | P-1 | P-2 | | |
| | 10.0 | 1.0 | 3.0 | | 2.5 | 2.5 | | 81.0 |
| I-9 | B-1 | | L-1 | | P-1 | | | |
| | 6.0 | | 6.0 | | 1.8 | | | 86.2 |
| I-10 | B-1 | B-7 | L-2 | | P-2 | | | |
| | 4.0 | 2.0 | 6.0 | | 1.8 | | | 84.2 |
| I-11 | B-5 | B-8 | L-1 | | P-1 | | | |
| | 10.0 | 2.0 | 5.0 | | 3.0 | | | 80.0 |
| I-12 | B-6 | B-10 | L-1 | L-3 | | | | |
| | 10.0 | 1.0 | 3.0 | 5.0 | | | | 80.0 |
| I-13 | B-3 | B-9 | L-6 | L-4 | P-5 | | | |
| | 6.0 | 0.3 | 4.5 | 1.0 | 1.0 | | | 87.2 |
| I-14 | B-4 | B-12 | L-5 | | P-1 | | | |
| | 6.0 | 0.3 | 4.5 | | 3.0 | | 0.8 | 85.4 |
| I-15 | B-4 | B-10 | L-7 | | P-2 | P-6 | | |
| | 6.0 | 0.2 | 4.5 | | 1.5 | 3.0 | | 84.5 |
| I-16 | B-2 | | L-1 | | P-1 | P-2 | | |
| | 6.0 | | 3.0 | | 3.0 | 1.5 | | 86.2 |
| I-17 | B-6 | B-8 | L-1 | L-3 | | | | |
| | 10.0 | 2.0 | 3.0 | 5.0 | | | | 80.0 |
| I-18 | B-1 | | | | P-1 | | | |
| | 6.0 | | | | 1.8 | | | 86.2 |
| I-19 | B-13 | | L-1 | | P-1 | P-2 | | |
| | 6.0 | | 3.0 | | 3.0 | 1.5 | | 86.2 |

*The numbers shown in the columns of the above Table denote "parts by weight".

Further, two species of inks (R-1 and R-2) for recording material layer were prepared by using compositions shown in the following Table 7. The ink R-1 was a heat-fusible ink and was prepared by melt-kneading respective materials by means of a blade kneader at 100° C. for 6 hours. The ink R-2 was a sublimable dye ink prepared at 50° C. in a similar manner as described above.

TABLE 7

| Ink for recording material layer | Composition | wt. parts |
|---|---|---|
| R-1 | Paraffin wax | 10 |
| | Carnauba wax | 10 |
| | Ethylene-vinyl acetate copolymer (Sumitate HC-10, mfd. by Sumitomo Kagaku K.K.) | 1 |
| | Carbon black (Seast 3, mfd. by Tokai Denkyoku K.K.) | 2 |
| R-2 | Disperse dye (Kayaset Blue 714, mfd. by Nihon Kayaku K.K.) | 4.0 |
| | Polyvinyl butyral resin (Esrec BX-1, mfd. by Sekisui Kagaku K.K.) | 4.3 |
| | Methyl ethyl ketone/toluene (wt. ratio = 1/1) | 80.0 |
| | Isobutanol | 10.0 |

Then, by using each of the inks for back coating layer as shown in Table 6, and inks for recording material layer as shown in Table 7, a back coating layer was formed on one surface side of a 6 μm-thick polyethylene terephthalate film (Lumirror F-53, mfd by Toray K. K) and a recording material layer was formed on the other surface side, respectively, thereby to prepare 24 species (Sample-1 to Sample-24) of thermal transfer sheets. The inks for back coating layer and recording material layer used for each of the above-mentioned mentioned sample were those as shown in Table 8 appearing hereinafter.

In this instance, with respect to the inks for back coating layer No. I-1, I-2, I-3, I-9 and I-10, each of these inks was applied onto the above-mentioned film in a coating amount (based on solid content) of 0.2 $g/m^2$ and 0.5 $g/m^2$ by means of a wire bar coater, and the resultant coating was heat-treated for 48 hours in an oven heated up to 60° C., thereby to form a back coating layer.

With respect to the other inks for each coating layer, each of these inks was applied onto the above-mentioned film in a coating amount (based on solid content) of 0.2 $g/m^2$ or 0.5 $g/m^2$ by means of a wire bar coater, and the resultant coating was dried by hot air, thereby to form a back coating layer.

With respect to the Sample-16, the above-mentioned primer coating material was applied onto a polyethylene terephthalete film in a coating amount (based on solid content) of 0.2 $g/m^2$ by means of a wire bar coater, and then dried thereby to form a primer layer in advance. Thereafter, a back coating layer was formed onto the thus formed primer layer.

The ink R-1 for recording material layer was heated at 100° C. and applied onto the surface of the substrate film reverse to the surface thereof provided with the above-mentioned back coating layer, by a hot-melt roller coating method in a coating amount of about 5.0 $g/m^2$, thereby to form a recording material layer.

On the other hand, the ink R-2 for recording material layer was applied onto the surface of the substrate film reverse to the surface thereof provided with the above-mentioned back coating layer, by means of a wire bar in a coating amount of 2.0 $g/m^2$ (after drying), and then dried, thereby to form a recording material layer.

Among the thus prepared samples, Samples 1 to 8 were in accordance with the second aspect of the present invention, Samples 9 to 12 were in accordance with the third aspect of the present invention, Samples 13 to 16 were in accordance with the first aspect of the present invention, Samples 17 to 21 were in accordance with the fourth aspect of the present invention, and Samples 4 and 19 were in accordance with the fifth aspect of the present invention.

By use of the 24 species of the thermal transfer material samples prepared above, the following items were evaluated and measured.

(1) Friction coefficient

The friction coefficient between the back coating layers was measured according to the rod method under a load of 100 g/cm at a speed of 100 mm/min. The results are shown in Table 8 appearing hereinafter.

(2) Anti-striking property

1) Device for test:

thin film head 6 d/mm, 17 V, 2 ms=1.66 mj/d solid image

2) Device for practical use: partially grazed thin film head 8 d/mm, solid black image The test was conducted under the above-mentioned respective conditions. With respect to the Samples 1 to 16, and 22 to 23, plain paper was used for printing. With respect to the Samples 17 to 21, and the Sample 24, printing was effected on an image-receiving sheet for thermal transfer instead of the plain paper. The image-receiving sheet was prepared by applying a coating liquid having the following composition onto one surface side of synthetic paper (Upo FRG-150, thickness=150 μm, mfd. by Oji Yuka K. K.) in a coating amount of 4.0 $g/m^2$ (after drying) and drying the resultant coating, thereby to form a dye-receiving layer.

| Coating liquid composition | |
|---|---|
| Polyester (Bairon 103, mfd. by Toyo Boseki K.K.) | 8.0 parts |
| Polymer plasticizer (Erubaroi 741P, mfd. by Mitsui polychemical K.K.) | 2.0 parts |
| Amino-modified silicone oil (KF-393, mfd. by Shinetsu Silicone K.K.) | 0.125 parts |
| Epoxy-modified silicone oil (X-22-343, mfd by Shinetsu silicone K.K.) | 0.125 parts |
| Toluene | 70.0 parts |
| Methyl ethyl ketone | 10.0 parts |
| Cyclohexanone | 20.0 parts |

The results are shown in Table 8 appearing hereinafter according to the following evaluation standards.

With respect to the Samples 1 to 16, and 22 to 23, plain paper was used for printing.

As a result, with respect to the samples 1 to 21, no sticking phenomenon occurred, no wrinkle occurred, and the thermal transfer sheet was smoothly driven without causing no problem. On the other hand, samples 22, 23 and 24 caused considerable sticking phenomenon and was incapable of printing.

◎—Excellent

○—Substantially no problem

Δ—Somewhat problematic

×—Difficult to be used.

(3) Heat-resistance

Static characteristic was evaluated by using a device for test as a current-conduction time of 6 ms. The results are shown in Table 8 appearing hereinafter according to the following evaluation standards.

◎—9.8 V=1.66 mj/d or higher

×—9.2 V=1.46 mj/d or lower.

(4) Film strength

Heat-wiping test under heating was conducted by using a calendar roller.

Conditions 12 mm-diameter roller coated with chromium plating.

30 rpm, 100° C., 0.2 kg/cm, 5 min.

The back coating loyer was caused to contact the roller surface and the peeling of the back coating layer was evaluated under the above-mentioned conditions. The results are shown in Table 8 appearing hereinafter.

◎—Excellent

○—Substantially no problem

Δ—Degree of peeling was below 5%

×—Degree of peeling was 10% or higher.

(5) Storability

With respect to Samples 19 to 21 and 24, storability test was conducted in the following manner. The recording material layer of the test piece (50×50 mm)was superposed on the back coating layer thereof, and evaluation was conducted by using a blocking tester under a predetermined load under the following conditions.

i) The above-mentioned layers were caused to closely contact each other under a pressure of 5 kg/cm$^2$, and were left standing for 48 hours at 55° C.

ii) The above-mentioned layers were caused to closely contact each other under a pressure of 2 kg/cm$^2$, and were left standing for 24 hours at 60° C.

The results are shown in Table 8 appearing hereinafter according to the following evaluation standards.

◎—Excellent
○—Substantially no problem
Δ—Somewhat problematic
×—Difficult to be used.

TABLE 8

| Sample No. | Back coating ink No. | Recording material ink No. | Friction coefficient Static friction | Friction coefficient Dynamic friction | Anti-sticking Device for test | Anti-sticking Device for practical use | Heat-resistance | Film strength Calendar roller | Storability 55° C. | Storability 60° C. |
|---|---|---|---|---|---|---|---|---|---|---|
| Sample | | | | | | | | | | |
| 1 | I-1 | R-1 | 0.27 | 0.23 | ○ | ○ | ○ | ○ | ○ | ○ |
| 2 | I-2 | ↑ | 0.26 | 0.24 | ○ | ○ | ○ | ◎ | ○ | ○ |
| 3 | I-3 | ↑ | 0.12 | 0.11 | ○ | ○ | ○ | ◎ | ○ | ○ |
| 4 | I-4 | ↑ | 0.24 | 0.20 | ◎ | ◎ | ○ | ◎ | ○ | ○ |
| 5 | I-5 | ↑ | 0.26 | 0.26 | ◎ | ◎ | ○ | ◎ | ○ | ○ |
| 6 | I-6 | ↑ | 0.15 | 0.14 | ◎ | ◎ | ○ | ◎ | ○ | ○ |
| 7 | I-7 | ↑ | 0.28 | 0.26 | ○ | ○ | ○ | ○ | ○ | ○ |
| 8 | I-8 | ↑ | 0.26 | 0.24 | ○ | ○ | ○ | ○ | ○ | ○ |
| 9 | I-9 | ↑ | 0.30 | 0.28 | Δ – ○ | Δ – ○ | ○ | — | ○ | ○ |
| 10 | I-10 | ↑ | 0.28 | 0.26 | Δ – ○ | Δ – ○ | ○ | — | ○ | ○ |
| 11 | I-11 | ↑ | 0.28 | 0.28 | ○ | ○ | ○ | — | ○ | ○ |
| 12 | I-12 | ↑ | 0.14 | 0.12 | ○ | ○ | ○ | — | ○ | ○ |
| 13 | I-13 | ↑ | 0.40 | 0.28 | ○ | ○ | ○ | — | ○ | ○ |
| 14 | I-14 | ↑ | 0.24 | 0.23 | ○ | ○ | ○ | — | ○ | ○ |
| 15 | I-15 | ↑ | 0.18 | 0.13 | ○ | ○ | ○ | — | ○ | ○ |
| 16 | I-16 | ↑ | 0.15 | 0.13 | ○ | ○ | ○ | — | ○ | ○ |
| 17 | I-9 | R-2 | — | — | ○ | ○ | ○ | — | ◎ | ◎ |
| 18 | I-2 | ↑ | — | — | ○ | ○ | ○ | — | ○ | ○ |
| 19 | I-4 | ↑ | — | — | ◎ | ◎ | ○ | — | ◎ | ◎ |
| 20 | I-11 | ↑ | — | — | ○ | ○ | ○ | — | ◎ | ◎ |
| 21 | I-17 | ↑ | — | — | ○ | ○ | ○ | — | ◎ | ◎ |
| 22 | I-18 | R-1 | 0.40 | 0.34 | × | × | × | — | × | × |
| 23 | I-19 | ↑ | 0.21 | 0.18 | × | × | × | — | × | × |
| 24 | I-18 | R-2 | — | — | × | × | × | — | × | × |

What is claimed is:

1. A thermal transfer sheet comprising a substrate film, a recording material layer formed on one surface side of the substrate film, and a back coating layer formed on the other surface side of the substrate film to be in contact with a thermal head, wherein the back coating layer comprises a binder and at least two species of heat-resistant particles having different particle sizes the ratio between the weight of the larger species of particle and that of the smaller species of particle being from 20 to 80 to 80 to 20, the back coating layer having a thickness of 0.1 to 0.5 μm, the smaller species of particle having a particle size which is 0.5 to 0.1 times the particle size of the larger heat-resistant particles, the larger species of particle having a particle size of ½ X to X, wherein X denotes the thickness of the back coating layer, the total amount of the heat-resistant particles being 10 to 200 wt. parts with respect to 100 wt. parts of the binder and the smaller species of particle filling the gaps between the larger species of particles.

2. A thermal transfer sheet comprising a substrate film, a recording material layer formed on one surface side of the substrate film, and a back coating layer formed on the other surface side of the substrate film to be in contact with a thermal head, wherein the back coating layer comprises a binder and an alkylphosphate multi-valent metal salt represented by the following formula:

$$[(RO)_2\overset{O}{\overset{\|}{P}}-O-]_nM, \text{ and/or}$$

$$[(RO)\overset{O}{\overset{\|}{P}}=(O-)2]_{n/2}M,$$

wherein R denotes an alkyl group having 12 to 20 carbon atoms; M denotes a zinc cation or a aluminum cation; and n denotes the valence of M the alkylphosphate multi-valent metal salt being contained in the back coating layer in an amount of 10 to 150 wt. parts with respect to 100 wt. parts of the binder, the alkylphosphate multi-valent metal salt having a melting point of 150° to 200° C. and the back coating layer having a thickness of 0.1 to 0.5 μm.

* * * * *